United States Patent [19]

Hefner, Jr. et al.

[11] Patent Number: 4,485,220
[45] Date of Patent: Nov. 27, 1984

[54] POLYOXAZOLINE MODIFIED UNSATURATED POLYESTERAMIDES

[75] Inventors: Robert E. Hefner, Jr., Lake Jackson, Tex.; Robert E. Hefner, Sr., Midland, Mich.

[73] Assignee: The Dow Chemical Company, Midland, Mich.

[21] Appl. No.: 452,583

[22] Filed: Dec. 23, 1982

[51] Int. Cl.$^3$ .................. C08G 69/44; C08L 77/12
[52] U.S. Cl. .................................... 525/411; 525/421; 525/447; 525/445; 528/288
[58] Field of Search ............... 525/411, 447, 421, 445; 528/288

[56] References Cited

U.S. PATENT DOCUMENTS

| | | | |
|---|---|---|---|
| 3,346,527 | 10/1967 | Lagally | 528/424 |
| 3,438,943 | 4/1969 | Miranda | 528/289 |
| 3,483,145 | 12/1969 | Levy | 528/424 |
| 3,932,358 | 1/1976 | de Cleur | 528/288 |
| 4,217,429 | 8/1980 | Wagner | 525/411 |
| 4,320,221 | 3/1982 | Hoffman | 528/69 |

Primary Examiner—John C. Bleutge
Assistant Examiner—Patricia Short

[57] ABSTRACT

A modified unsaturated polyester (polyesteramide) is the reaction product of a diacid or anhydride (such as maleic anhydride), a polyahl (such as an aliphatic glycol), and an effective amount of a poly[(alkionylimino)alkylene] (such as poly[(propionylimino)ethylene], otherwise known as poly(2-ethyl-2-oxazoline)) wherein at least one of the diacid or anhydride, and the polyahl, have addition polymerizable unsaturation. The modified polyesters of the invention have improved physical properties compared to similar polyesters prepared without the poly[(alkionylimino)alkylene].

18 Claims, No Drawings

POLYOXAZOLINE MODIFIED UNSATURATED POLYESTERAMIDES

BACKGROUND OF THE INVENTION

This invention relates to chemical modification of unsaturated polyesters with poly[(alkionylimino)alkylene]s, otherwise known as poly(oxazolines).

Unsaturated polyesters are generally macromolecules with polyester backbones derived from the reaction of unsaturated diacids or unsaturated anhydrides with polyhydric alchols. The reaction normally proceeds at 190°–220° C. until a predetermined acid value/viscosity relationship has been achieved. Solutions of these polymers in vinyl monomers (e.g., styrene) are often called polyester resins. These are frequently compounded with filler or fibers and are cured with the aid of a free radical initiator. Unsaturated polyesters can be masscast, laminated, molded, pultruded, and made into gel coats in a variety of colors.

The physical properties of a cured polyester resin are interrelated to a certain degree with the structural features of the three-dimensional network. However, there is no unifying concept that correlates these features with the physical properties. The structure, ratio of acid and glycol components, molecular weight, polydispersity, type of end groups, and type of unsaturation can have varying effects upon the physical properties of the cured resin.

In spite of the lack of predictability inherent in this field, great strides have been made in producing high-quality unsaturated polyesters. However, the market place yearns for even further improvement in the physical properties of the cured resins. Specifically, improvements in properties such as hardness, heat distortion temperature, resistance to thermal aging, tensile strength, and flexural strength are desired.

SUMMARY OF THE INVENTION

In one aspect, the invention is a modified unsaturated polyester (polyesteramide) comprising the reaction product of a curing amount of a diacid or anhydride, a curing amount of a poly-active-hydrogen compound, and an effective amount of a poly[(alkionylimino)alkylene], wherein at least a portion of one of the diacid or anhydride, or the polyahl, contains addition polymerizable unsaturation.

The modified unsaturated polyesters of the invention have excellent physical properties including hardness, heat distortion temperature, resistance to thermal aging, tensile strength, and flexural strength.

DETAILED DESCRIPTION OF THE INVENTION

The unsaturated polyesters (more precisely, polyesteramides) of the invention are prepared from a diacid or anhydride of a diacid (hereinafter referred to as the acid component) and a poly-active-hydrogen compound (hereinafter referred to as the polyahl), with at least a portion of one of the acid components or the polyahl having addition polymerizable unsaturation. Although embodiments wherein only the polyahl or both the polyahl and acid component have addition polymerizable unsaturation are within the scope of the invention, they are less preferred, compared to embodiments in which only the acid component has addition polymerizable unsaturation.

As a first component, the polyesters of the invention require a diacid or an anhydride of a diacid. The only requirements for these compounds is that the anhydride or acid groups be available to participate in at least two esterification reactions. By "esterification reaction" is meant both those reactions which result in a true ester linkage

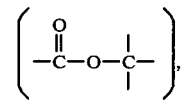

but also those reactions which are analogous to an esterification such as an amidation

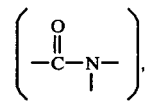

and so forth. As mentioned above, while the addition polymerizable unsaturation may be present exclusively in the polyahl, there is preferably addition polymerizable unsaturation in at least the acid component, and most preferably the addition polymerizable unsaturation is exclusively in the acid component. Examples of suitable acid components which do not contain addition polymerizable unsaturation include phthalic acid, isophthalic acid, adipic acid, phthalic anhydride, and the like. Examples of suitable acid components which contain addition polymerizable unsaturation include fumaric acid, maleic acid, itaconic acid, citraconic acid, etc., and the anhydride of maleic acid. Because of its low cost, ease of use, and desirable properties, maleic anhydride is preferred as the unsaturated acid component.

As a second component, the polyesters of the invention require a polyahl. By "polyahl" is meant any compound having a plurality of active hydrogen moieties which are available for participation in an esterification reaction. Here, the term "esterification reaction" is intended to have the broad meaning given above. Included within the class of polyahls are polyalcohols (polyols), polyamines, polymercaptans, and so forth. Also included are compounds with heterogeneous active hydrogen functionality such as aminoalcohols.

Preferred polyahls include polyamines such as 1,2-diaminoethane, 1,4-diaminobutane, 1,6-diaminohexane, bis(aminomethyl)dicyclopentadiene, diaminodiphenyl oxide, piperazine, diethylenetriamine, and the like or mixtures thereof. More preferred as the polyahl are polyols such as those described in U.S. patent application Ser. No. 333,221, filed Dec. 21, 1981 (Hefner, Jr. and Uroda) incorporated herein by reference. Suitable classes of polyols include glycols, glycol ethers, and so forth. Representative polyols include ethylene glycol, propylene glycol, diethylene glycol, dipropylene glycol, dicyclopentadiene dimethanol, 2-butene-1,4-diol, cyclohexanedimethanol, bis(hydroxymethyl)norbornane, methylcyclohexanedimethanol, bis(hydroxypropyl)bisphenol A, pentaerythritol, sorbitol, glycerine, and polypropoxylates of glycerine. Because of low cost, ease of use, and ready availability, aliphatic glycols are preferred as the polyol. Further information on polyahls generally, is available, for instance, in U.S. Pat. No. 4,320,221 (Hoffman, 1982).

As previously stated, although not preferred, the polyahl may contain addition polymerizable unsaturation; either in addition to, or to the exclusion of, unsaturation in the acid component. Polyahls having inherent unsaturation in a straight chain molecule (such as 2-butene-1,4-diol and 3-heptene-1,7-diol) do not readily participate in addition polymerization reactions and are only marginally suitable for use as an unsaturated polyahl. They are, however, very useful as a polyahl which does not have addition polymerizable unsaturation. More suitable unsaturated polyahls include those having α, β-unsaturation such as bis(2-hydroxyethyl)-fumarate.

As a third component, the polyesters of the invention require a poly[(alkionylimino)alkylene]. Poly[(alkionylimino)alkylene]s are compounds which desirably are represented by the formula

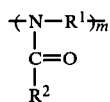

in which $R^1$ is an ethyl or propyl group, $R^2$ is a hydrogen or an alkane, and m is greater than 2. Preferably, m is such that the molar mass (molecular weight) is about 500 to about 5,000,000, more preferably about 50,000 to about 500,000, amu.

The poly[(alkionylimino)alkylene]s are desirably prepared by the ring-opening polymerization of a 2-alkyloxazoline. Desirably, the oxazoline starting materials are represented by the formula

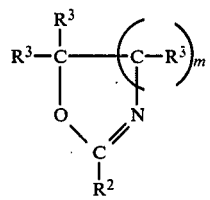

in which each $R^3$ is independently a hydrogen atom, a halogen, or an organic radical, $R^2$ is a hydrogen, a halogen, or an organic radical not having addition polymerizable unsaturation, and m is 1 or 2. In a preferred embodiment, at least two of $R^3$ are hydrogen atoms and m is 1. In another preferred embodiment, all of $R^3$ are hydrogen atoms and m is 1. In another preferred embodiment, $R^2$ is an ethyl radical. In the most preferred embodiment, all of $R^3$ are hydrogen atoms, $R^2$ is an ethyl radical, and m is 1 (2-ethyl-2-oxazoline).

The oxazolines are conveniently polymerized in the presence of a catalyst in a ring-opening reaction. This polymerization is explained, for example, by Tomalia et al., *Journal of Polymer Science*, Vol. 4, Part A-1, pages 2253–2267 (1966); Kagiya, *Journal of Polymer Science—Polymer Letters*, Vol. 4 Page 441–445 (1966); Seeliger et al., *Angewandt Chemische—International Edition*, Vol. 5, No. 6, page 612 (1966); Seeliger et al, *Angewandt Chemische—International Edition*, Vol. 5, No. 10, pages 875–888 (1966); Frump, *Chemical Reviews*, Vol. 71, No. 5, pages 483–505 (1971); Jones et al., U.S. Pat. No. 3,640,909 (1972) and Saegusa, *Polymer Journal*, Vol. 3, No. 1, pages 35–39 (1972).

While not preferred, the poly[(alkionylimino)alkylene] may be partially hydrolyzed, thereby inserting

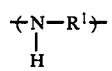

groups into the polymer chain. Hydrolysis is not preferred.

The poly[(alkionylimino)alkylene]may be incorporated into the polyester by any of several means. In a preferred embodiment, the unmodified, unsaturated polyester is prepared to completion, and the poly[(alkionylimino)alkylene] then added to react with the polyester. Alternatively, a poly[(alkionylimino)alkylene] may be added to the unreacted or partially reacted polyester monomers.

The reaction of the poly[(alkionylimino)alkylene] with the polyester will take place under relatively mild conditions (e.g., about 100° to about 225° C.

The acid component and polyahl are each present in a curing amount. By "curing amount" is meant that they are present in relative proportion to one another and in proportion to the other ingredients, so that esterification will take place. Desirably, the reactants are present in proportions such that the resin is capable of addition polymerization to form an insoluble solid. Generally, the polyester will contain desirably about 0.5 to about 1.5, more desirably about 0.8 to about 1.3, and preferably about 0.9 to about 1.1, equivalents of polyahl per equivalent of polyacid. If a chain termination agent such as dicyclopentadiene is used in large amounts, it is desirable to reduce the quantity of polyahl. For instance, if 0.75 equivalent of termination agent is used per equivalent of diacid, it would be desirable to include only about 0.2 to about 0.8 equivalent of polyahl. However, if only about 0.005 equivalent of termination agent is used, it would generally not be necessary to alter the amount of polyahl.

The poly[(alkionylimino)alkylene] is present in an effect amount. By "effect amount" is meant that sufficient poly[(alkionylimino)alkylene] is present to increase the desired physical properties of the cured resin compared to a similar resin prepared without the poly[(alkionylimino)alkylene].

In addition to the acid component, polyahl, and poly[(alkionylimino)alkylene], other compounds may be incorporated into the polyester backbone. For instance, it is often desirable to use a substantial quantity of a diacid or anhydride which does not have an addition polymerizable moiety in addition to the unsaturated acid component. Such additions are frequently made to limit the extent of crosslinking present in the cured resin.

In a particularly preferred embodiment of the invention, a portion of the polyester (polyesteramide) molecules are terminated with a norbornyl radical. Dicyclopentadiene is a preferred material for providing the norbornyl chain termination. Polycyclopentadiene (i.e., dicyclopentadiene oligomers) or dicyclopentadiene monoalcohol are also preferred species. Norbornene, itself can also be used, although less preferred. Details for the incorporation of dicyclopentadiene into the unsaturated polyester is taught in U.S. patent application, Ser. No. 333,221 filed Dec. 21, 1981 and U.S. Pat. Nos. 4,029,848; 4,246,367; 4,233,432 and 4,148,765 which are incorporated herein by reference.

The unsaturated polyesters of the invention may be formulated with any suitable monomer or mixture of monomers. Typical monomers include vinyl (or ethylenically unsaturated) monomers or acrylic monomers. Representative monomers include styrene, vinyltoluene, t-butylstyrene, chlorostyrene, divinylbenzene, dicyclopentadiene acrylate, sec-butylacrylate, ethyl acrylate, and the like.

The details of adding these, as well as other additives are well known to those skilled in the art. Further teachings of the general technology regarding unsaturated polyesters may be found, for instance, at "Kirk-Othmer Encyclopedia of Technology," Third Edition, Vol 18, pages 575–549, and U.S. Pat. Nos. 2,610,958; 2,610,168; 2,632,753; 2,361,538; 2,780,928; 2,718,290; 2,634,251; 2,196,033; 2,552,910; 3,533,999 and French Pat. No. 1,336,751.

The resins of the invention, especially when formulated with an addition polymerizable monomer, are especially well suited for use in the manufacture of fibrous laminates. Such laminates may be prepared by adding to the resin, a free radical or other suitable addition polymerization catalyst. The catalyzed mixture is then combined with fibers, and formed.

Examples of suitable catalysts include benzoyl peroxide, tertiary butyl hydroperoxide, methylethyl ketone peroxide, and the like. It is frequently of value to add accelerators such as cobalt naphthenate, dimethylaniline, and the like.

Examples of suitable fibers include asbestos, carbon, glass, and organic fibers.

The resin may be rolled, sprayed, or impregnated into the fibrous reinforcement and cured in a manner well known to those skilled in the art. The resin may be compounded with solvents, pigments, or other resinous products and cured to form useful coatings in a manner well known in the art.

The invention will be further illustrated in the following examples. In the examples, all parts and percentages are by weight unless otherwise specied.

EXAMPLE 1

A dicyclopentadiene modified unsaturated polyesteramide is prepared via reaction of a dicyclopentadiene modified unsaturated polyester and 50,000 average molecular weight poly(2-ethyl-2-oxazoline). Specifically, the reaction is performed as follows: maleic anhydride (3.0 moles, 294.18 g) is added to a reactor and heated to a clear, stirred 70° C. solution maintained under a nitrogen atmosphere. Water (1.575 moles, 28.38 g) is added, followed by dicyclopentadiene concentrate (0.45 mole, 59.50 g) 2 minutes later. The dicylopentadiene concentrate contains 0.31 percent lights, 13.64 percent cyclopentadiene codimers and diolefin dimers, and 86.05 percent dicyclopentadiene. A maximum exotherm of 112° C. results 10 minutes later. Additional dicyclopentadiene concentrate (0.45 mole, 59.50 g) and water (0.525 mole, 9.46 g) are added to the reactor 20 minutes after the initial water addition. A third aliquot of dicyclopentadiene concentrate (0.45 mole, 59.50 g) is added 15 minutes later. Another 15 minutes later, a final aliquot of dicyclopentadiene concentrate (0.45 mole, 59.50 g) is added and the temperature controller is set at 110° C. This temperature is achieved 5 minutes later. After 30 minutes, propylene glycol (2.34 mole, 178.07 g) is added to the reactor and the steam condenser is started, nitrogen sparging is increased to 2 liters/min., and the temperature controller is set at 160° C. The 160° C. temperature is reached 15 minutes later. After 2 hours at 160° C., the temperature controller is set at 205° C. and this temperature is achieved 11 minutes later. After 1.70 hours at the 205° C. reaction temperature, the acid number is 37.0. At this time, 50,000 average molecular weight poly(2-ethyl-2-oxazoline) (36.51 g) is added to the reactor. After an additional 1.25 hours at the 205° C. reaction temperature, a total of 67 milliliters (ml) of water layer and 7 ml of organic material are collected in the Dean Stark trap. The reactor is cooled to 165° C. and 100 ppm of hydroquinone is added. The modified unsaturated polyesteramide alkyd is recovered as a transparent, light yellow solid with a final acid number of 28.4.

EXAMPLE 2

A dicyclopentadiene modified unsaturated polyesteramide is prepared via reaction of a dicyclopentadiene modified unsaturated polyester and a 550,000 average molecular weight poly(2-ethyl-2-oxazoline). Specifically, the reaction is performed as follows: maleic anhydride (3.0 mole, 294.18 g) is added to a reactor and heated to a clear, stirred 70° C. solution maintained under a nitrogen atmosphere. Water (1.575 moles, 28.38 g) is added, followed by dicyclopentadiene concentrate (0.45 mole, 59.50 g) 2 minutes later. The dicyclopentadiene concentrate contains 0.31 percent lights, 13.64 percent cyclopentadiene codimers and diolefin dimers, and 86.05 percent dicyclopentadiene. A maximum exotherm of 110° C. results 16 minutes later. Additional dicyclopentadiene concentrate (0.45 mole, 59.50 g) and water (0.525 mole, 9.46 g) are added to the reactor 20 minutes after the initial water addition. A third aliquot of dicyclopentadiene concentrate (0.45 mole, 59.50 g) is added 15 minutes later. Another 15 minutes later, a final aliquot of dicyclopentadiene concentrate (0.45 mole, 59.50 g) is added and the temperature controller is set at 110° C. This temperature is achieved 5 minutes later. After 30 minutes, propylene glycol (2.34 moles, 178.07 g) is added to the reactor, the steam condenser is started, nitrogen sparging is increased to 2 LPM, and the temperature controller is set at 160° C. The 160° C. temperature is reached 17 minutes later. After 2 hours at 160° C., the temperature controller is set at 205° C. and this temperature is achieved 25 minutes later. After 1.70 hours at the 205° C. reaction temperature, the acid number is 38.4. At this time, 550,000 average molecular weight poly(2-ethyl-2-oxazoline) (36.51 g) is added to the reactor. After an additional 0.50 hour at the 205° C. reaction temperature, a total of 69 ml of water layer and 7.5 ml of organic material is collected in the Dean Stark trap. The reactor is cooled to 165° C. and 100 ppm of hydroquinone is added. The modified unsaturated polyesteramide alkyd is recovered as a transparent, light yellow solid with a final acid number of 31.7.

EXAMPLE 3

A dicyclopentadiene modified unsaturated polyesteramide is prepared via reaction of a dicyclopentadiene modified unsaturated polyester and a 225,000 average molecular weight poly(2-ethyl-2-oxazoline). Specifically, the reaction is performed as follows: maleic anhdyride (3.0 mole, 294.18 g) is added to a reactor and heated to a clear, stirred 70° C. solution maintained under a nitrogen atmosphere. Water (1.575 moles, 28.38 g) is added, followed by dicyclopentadiene concentrate (0.45 mole, 59.50 g) 2 minutes later. The dicyclopentadiene concentrate contains 0.31 percent lights, 13.64 percent cyclopentadiene codimers and diolefin dimers, and 86.05 percent dicyclopentadiene. A maximum exotherm of 116° C. results 11 minutes later. Additional dicyclopentadiene concentrate (0.45 mole, 59.50 g) and water (0.525 mole, 9.46 g) are added to the reactor 20 minutes after the initial water addition. A third aliquot of dicyclopentadiene concentrate (0.45 mole, 59.50 g) is added 15 minutes later. Another 15 minutes later, a final aliquot of dicyclopentadiene concentrate (0.45 mole, 59.50 g) is added and the temperature controller is set at 110° C. This temperature is achieved 4 minutes later. After 30 minutes, propylene glycol (2.34 moles, 178.07 g) is added to the reactor, the steam condenser is started, nitrogen sparging is increased to 2 LPM, and the temperature controller is set at 160° C. The 160° C. temperature is reached 11 minutes later. After 2 hours at 160° C., the temperature controller is set at 205° C. and this temperature is achieved 11 minutes later. After 3.25 hours at the 205° C. reaction temperature, the acid number is 30.5. At this time, 225,000 average molecular weight poly(2-ethyl-2-oxazoline) (36.51 g) is added to the reactor. After an additional 1.0 hour at the 205° C. reaction temperature, a total of 83 ml of water layer and 5.0 ml of organic material is collected in the Dean Stark trap. The reactor is cooled to 165° C. and 100 ppm of hydroquinone is added. The modified unsaturated polyesteramide alkyd is recovered as a transparent, light yellow solid with a final acid number of 25.1.

COMPARATIVE EXAMPLE 1

A dicyclopentadiene modified unsaturated polyester is prepared as follows: maleic anhydride (7.0 moles, 686.42 g) is added to a reactor and heated to a clear, stirred 70° C. solution maintained under a nitrogen atmosphere. Water (3.675 moles, 66.22 g) is added, followed 2 minutes later by dicyclopentadiene concentrate (1.05 moles, 139.35 g). The dicyclopentadiene concentrate contains 0.31 percent lights, 13.64 percent cyclopentadiene codimers and diolefin dimers, and 86.05 percent dicyclopentadiene. A maximum exotherm of 118° C. results 11 minutes later. Additional dicyclopentadiene concentrate (1.05 moles, 139.35 g) and water (1.225 moles, 22.08 g) are added to the reactor 20 minutes after the initial water addition. A third aliquot of dicyclopentadiene concentrate (1.05 moles, 139.35 g) is added 15 minutes later. Another 15 minutes later, a final aliquot of dicyclopentadiene concentrate (1.05 moles, 139.35 g) is added and the temperature controller is set at 110° C. This temperature is achieved 4 minutes later. After 30 minutes, propylene glycol (5.46 moles, 415.51 g) is added to the reactor, the steam condenser is started, nitrogen sparging is increased to 4 LPM, and the temperature controller set at 160° C. The 160° C. temperature is reached 25 minutes later. After 2 hours at 160° C., the temperature controller is set at 205° C. and this temperature is achieved 31 minutes later. After 7.0 hours at the 205° C. reaction temperature, a total of 158 ml of water layer and 18 ml of organic material are collected in the Dean Stark trap. The reactor is cooled to 165° C. and 100 ppm of hydroquinone are added. The modified unsaturated polyester alkyd is recovered as a transparent, light yellow solid with a final acid number of 24.0.

EXAMPLE 4

A portion of the modified polyesteramide alkyds of Examples 1-3 and a portion of the modified polyester alkyd of Comparative Example 1 are each formulated to provide 57.0 weight percent alkyd/43.0 weight percent styrene solutions. These solutions are used to determine SPI gel and cure characteristics (84° C.), Brookfield viscosity (25° C.), and a clear, unfilled casting is made for heat distortion temperature, tensile and flexural strength, flexural modulus, percent elongation, and average Barcol hardness (934-1 scale) determinations. The casting is prepared using a cure system of 1.0 percent benzoyl peroxide and 0.01 percent dimethylaniline at room temperature, followed by postcuring for 2.0 hours at 93° C. (200° F.). The single exception is the polyesteramide resin of Example 3 in which the dimethylaniline accelerator is omitted. Mechanical properties are determined using an Instron machine with standard test methods (ASTM D-638 and D-790). Heat distortion temperatures (264 psi [1.82 Megapascals]) are determined using an Aminco Plastic Deflection Tester (American Instrument Co.) with standard test methods (ASTM D-648). The test results are shown in Table I.

TABLE I

| Properties | (Example 4) Example 1 | Example 2 | Example 3 | Comparative* Example 1 |
|---|---|---|---|---|
| Brookfield Viscosity (cp) | 1080 | 905 | >2000 | 126.5 |
| SPI Gel | | | | |
| Gel time (min.) | 3.4 | 4.1 | 3.0 | 3.6 |
| Cure time (min.) | 5.2 | 6.2 | 4.8 | 5.2 |
| Max. Exotherm (°C.) | 225 | 188 | 220 | 234 |
| Ave. Barcol Hardness | 46.7 | 47.3 | 48.3 | 47.2 |
| Heat Distortion Temp. (°F.) | 199 | 216 | 223 | 222 |
| Tensile Strength × $10^3$ (psi) | 4.6 | 4.6 | 3.4 | 3.5 |
| Elongation (%) | 1.07 | 1.11 | 0.72 | 0.79 |
| Flexural Strength × $10^3$ (psi) | 9.9 | 11.1 | 14.2 | 7.9 |
| Flexural Modulus × $10^5$ (psi) | 6.4 | 6.8 | 5.4 | 5.9 |

*Not an example of the invention.

When compared to the standard dicyclopentadiene modified unsaturated polyester of Comparative Example 1, each of the modified polyesteramides of Examples 1-3 possess significantly improved flexural strength. The polyesteramides of Examples 1 and 2 each possess improvements in the flexural modulus, tensile strength, and percent elongation.

EXAMPLE 5

An orthophthalic unsaturated polyesteramide is prepared via reaction of an orthophthalic unsaturated polyester and 225,000 average molecular weight poly(2-ethyl-2-oxazoline). Specifically, the reaction is performed as follows: maleic anhydride (2.76 moles, 264.76 g) and phthalic anhydride (1.80 moles, 266.62 g) are added to a reactor and heated to a white stirred slurry maintained at 100° C. under a nitrogen atmosphere. Propylene glycol (4.95 moles, 376.70 g) is added and a maximum exotherm of 138° C. occurs 25 minutes later. At this time, nitrogen sparging is increased to 0.5 liter/minute, the steam condenser is started, and the temperature controller is set at 160° C. This temperature is achieved 10 minutes later. After 1 hour, the temperature controller is set at 205° C. and this temperature is achieved 21 minutes later. After 6.90 hours at the 205° C. reaction temperature, the acid number is 35.0. At this time, 225,000 average molecular weight poly(2-ethyl-2-oxazoline) (10.45 g) is added to the reactor. After an additional 2.00 hours at the 205° C. reaction temperature, a total of 84.5 ml of water layer is recovered in the Dean Stark trap. The reactor is cooled to 160° C. and 100 ppm of hydroquinone is added. The unsaturated polyesteramide alkyd is recovered as a transparent, light yellow solid with a final acid number of 29.7.

COMPARATIVE EXAMPLE 2

An orthophthalic unsaturated polyester is prepared as follows: maleic anhydride (2.76 moles, 264.76 g) and phthalic anhydride (1.80 moles, 266.62 g) are added to a reactor and heated to a white, stirred slurry maintained at 100° C. under a nitrogen atmosphere. Propylene glycol (4.95 moles, 376.70 g) is added and a maximum exotherm of 137° C. occurs 23 minutes later. At this time, nitrogen sparging is increased to 0.5 liter/minute, the steam condenser is started, and the temperature controller is set at 160° C. This temperature is achieved 10 minutes later. After 1 hour, the temperature controller is set at 205° C. and this temperature is achieved 23 minutes later. After 7 hours, 80.5 ml of water layer is recovered into the Dean Stark trap. The reactor is cooled to 160° C. and 100 ppm of hydroquinone is added. The unsaturated polyester alkyd is recovered as a transparent solid with a final acid number of 31.4.

EXAMPLE 6

A portion of the unsaturated polyesteramide alkyd of Example 5 and the unsaturated polyester alkyd of Comparative Example 2 are each formulated to provide 57.0 weight percent alkyd/43.0 weight percent styrene solutions. These solutions are used to determine physical and mechanical properties using the methods of Example 4. The results are reported in Table II.

TABLE II

| | (Example 6) | |
|---|---|---|
| Properties | Example 5 | Comparative* Example 2 |
| Brookfield Viscosity (cp) | 347 | 112 |
| SPI Gel | | |
| Gel time (min.) | 3.3 | 2.4 |
| Cure time (min.) | 4.6 | 3.9 |
| Max. exotherm (°C.) | 228 | 223 |
| Ave. Barcol Hardness | 49 | 47 |
| Heat Distortion Temp. (°F.) | 215 | 199 |
| Tensile Strength × $10^3$ (psi) | 9.3 | 7.1 |
| Elongation (%) | 1.9 | 1.5 |
| Flexural Strength × $10^3$ (psi) | 19.4 | 18.4 |
| Flexural Modulus × $10^5$ (psi) | 6.3 | 6.0 |

*Not an example of the invention.

EXAMPLE 7

A 5.0 by 0.5 by 0.125 inch test piece is prepared from the clear, unfilled castings of Example 5 and Comparative Example 2. The test pieces are weighed and placed onto a flat aluminum tray which is then suspended in a forced air, convection-type oven. Further curing at 100° C. for 2.0 hours and then 125° C. for 5.0 hours is completed and is followed by heat aging at 150° C. for 65 hours, then at 175° C. for 120 hours. The test pieces are removed at the indicated exposure intervals, weighed, examined and then replaced into the oven. The weight data is used to calculate the percent weight loss as reported in Table III.

TABLE III

| | | (Example 7) | | | |
|---|---|---|---|---|---|
| Total Hours of Thermal Exposure | Exposure Temp. (°C.) | Percent Weight Loss | | Visual Observations | |
| | | Example 5 | Comparative Example 2 | Example 5 | Comparative Example 2 |
| 24 | 150 | −0.71 | −1.40 | unchanged | (1) |
| 48 | 150 | −0.81 | −1.61 | (1) | (2) |
| 72 | 150 | −0.91 | −1.76 | (1) | (2) |
| 96 | 175 | −1.39 | −2.43 | (1) | (2) (3) |
| 192 | 175 | −2.50 | −4.45 | (2) | (2) (3) |

(1) Slight surface crazing.
(2) Severe surface crazing.
(3) Fracturing.

EXAMPLE 8

A series of 5.0 by 0.5 by 0.125 inch heat distortion temperature test pieces are prepared from the clear, unfilled castings of Example 5 and Comparative Example 2. The test pieces are placed onto a flat aluminum tray which is then suspended in a forced air, convection-type oven. Further curing at 100° C. for 2.0 hours and then 125° C. for 5.0 hours is completed and followed by heat aging at 150° C. for 65 hours then 175° C. for 24 hours. The test pieces are removed at the indicated exposure intervals, and the heat distortion temperatures were determined using the method of Example 4. The results are reported in Table IV.

TABLE IV

| | (Example 8) | | |
|---|---|---|---|
| Total Hours of Thermal Exposure | Exposure Temp. (°C.) | Heat Distortion Temp. (°F.) | |
| | | Example 5 | Comparative Example 2 |
| 24 | 150 | 207 | 200 |
| 72 | 150 | 225 | 212 |
| 96 | 175 | 221 | 191 |

EXAMPLE 9

A dicyclopentadiene modified unsaturated polyesteramide is prepared via reaction of a dicyclopentadiene modified unsaturated polyesteramide and a 225,000 average molecular weight poly(ethyloxazoline). Specifically, the reaction is performed as follows: maleic anhydride (7.00 moles, 686.42 g) is added to a reactor and heated to a clear, stirred 100° C. solution maintained under a nitrogen atmosphere. Water (7.10 moles, 127.94 g) is added, inducing a maximum exotherm of 131° C. 2 minutes later. Fifteen minutes after the initial water addition, the reactor is air cooled to 121° C. and 97 percent pure dicyclopentadiene (2.10 moles, 277.64 g) is added. A maximum exotherm of 126° C. results 2 minutes later. A second aliquot of dicyclopentadiene (2.10 moles, 277.64 g) is added 15 minutes after the initial dicyclopentadiene addition. A maximum exotherm of 128° C. results 3 minutes later. Air cooling reduces the reaction temperature to 120° C. Fifteen minutes after the second dicyclopentadiene addition, a final aliquot of dicyclopentadiene (2.10 moles, 277.64 g) is added. The 120° C. reaction temperature is reachieved 3 minutes later and then maintained for 30 minutes. Propylene glycol (3.78 moles, 287.66 g) and (anhydrous) piperazine (0.420 mole, 36.18 g) are added to the reactor, the steam condenser started, nitrogen sparging increased to 0.75 liter/minute, and the temperature controller set at 160° C. The 160° C. temperature is reached 14 minutes later. After 2 hours at 160° C., the temperature controller is set at 205° C. and this temperature is achieved 33 minutes later. After 10 hours at the 205° C. reaction temperature, the acid number is 28.5. At this time, 225,000 average molecular weight polyethyloxazoline (9.20 g) is added to the reactor. After an additional 4 hours at the 205° C. reaction temperature, a total of 157.5 ml of water layer and 33.0 ml of organic material are collected in the Dean Stark trap. The reactor is cooled to 168° C. and 100 ppm of hydroquinone are added. The modified unsaturated polyesteramide alkyd is recovered as a transparent, yellow solid with a final acid number of 18.8.

EXAMPLE 10

A dicyclopentadiene modified unsaturated polyesteramide is prepared using the method of Example 9 with the exception that 13.90 g of 225,000 average molecular weight polyethyloxazoline are used in place of the 9.20 g of 225,000 average molecular weight polyethyloxazoline of Example 9. The modified unsaturated polyesteramide alkyd is recovered as a transparent, light amber solid with a final acid number of 17.6.

COMPARATIVE EXAMPLE 3

A comparative dicyclopentadiene modified unsaturated polyesteramide is prepared as follows: maleic anhydride (7.00 moles, 686.42 g) is added to a reactor and heated to a clear, stirred 110° C. solution maintained under a nitrogen atmosphere. Water (7.10 moles, 127.94 g) is added, inducing a maximum exotherm of 135° C. 2 minutes later. Fifteen minutes after the initial water addition, the reactor is air cooled to 121° C. and 97 percent pure dicyclopentadiene (2.10 moles, 277.64 g) is added. A maximum exotherm of 126° C. results 2 minutes later. Air cooling reduces the reaction temperature to 120° C. A second aliquot of dicyclopentadiene (2.10 moles, 277.64 g) is added 15 minutes after the initial dicyclopentadiene addition. A maximum exotherm of 128° C. results 4 minutes later. Air cooling reduces the reaction temperature to 120° C. Fifteen minutes after the second dicyclopentadiene addition, a final aliquot of dicyclopentadiene (2.10 moles, 277.64 g) is added. The 120° C. reaction temperature is reachieved 3 minutes later and then maintained for 30 minutes. Propylene glycol (3.78 moles, 287.66 g) and (anhydrous) piperazine (0.420 mole, 36.18 g) are added to the reactor, the steam condenser started, nitrogen sparging increased to 0.75 liter/minute, and the temperature controller set at 160° C. The 160° C. temperature is reached 20 minutes later. After 2 hours at 160° C., the temperature controller is set at 205° C. and this temperature is achieved 25 minutes later. After 14 hours at the 205° C. reaction temperature, a total of 154 ml of water layer and 26.5 ml of organic material are collected in the Dean Stark trap. The reactor is cooled to 168° C. and 100 ppm of hydroquinone are added. The modified unsaturated polyesteramide alkyd is recovered as a transparent, light yellow solid with a final acid number of 18.9.

EXAMPLE 11

A portion of the dicyclopentadiene modified unsaturated polyesteramide alkyds of Example 9, Example 10, and Comparative Example 3 are each formulated to provide 57.0 percent alkyd-43.0 percent styrene solutions. These solutions are cured and their physical and mechanical properties are determined using the methods of Example 4. The results are reported in Table V.

TABLE V
(Example 11)

| Properties | Example 9 | Example 10 | Comparative* Example 3 |
|---|---|---|---|
| Brookfield Viscosity (cp) | 165 | 1663 | 171 |
| SPI Gel | | | |
| Gel time (min.) | 3.1 | 2.9 | 2.6 |
| Cure time (min.) | 5.4 | 4.8 | 4.3 |
| Max. exotherm (°C.) | 223 | 207 | 214 |
| Ave. Barcol Hardness | 41 | 41 | 41 |
| Heat Distortion Temp. (°F.) | 200 | 212 | 224 |
| Tensile Strength × $10^3$ (psi) | 7.1 | 7.1 | 4.8 |
| Elongation (%) | 1.8 | 1.7 | 1.2 |
| Flexural Strength × $10^3$ (psi) | 13.5 | 15.4 | 13.4 |
| Flexural Modulus × $10^5$ (psi) | 5.6 | 5.6 | 5.8 |

*Not an example of the invention.

When compared to the standard modified unsaturated polyesteramide of Comparative Example 3, the modified unsaturated polyesteramides of both Examples 9 and 10 possess significantly improved tensile strength and elongation.

EXAMPLE 12

A portion of the dicyclopentadiene modified unsaturated polyesteramide alkyds of Example 9 and Comparative Example 3 are each formulated to provide 57.0 percent alkyd-43.0 percent styrene solutions. These solutions are used to prepare laminates in accordance with the following standard hand layup procedure: a cure system of 1.0 percent methyl ethyl ketone peroxide and 0.3 percent cobalt naphthenate (6.0 percent) is used for the laminates. Both of the modified unsaturated polyesteramide solutions are retarded with 100 ppm of p-benzoquinone prior to lamination. This is necessary to prevent gelation during the laminate preparation.

A sheet of 0.005 inch Mylar film is attached to a smooth flat surface with masking tape. An area of sufficient size is covered with a thin coating of the laminating resin and a surface C-veil from Owens Corning Fiberglas Corporation is laid down and smoothed out. Additional resin is applied and a first layer of 1.5 oz. chopped fiberglass mat having a surface coupling agent is applied. The laminate is carefully rolled down with a serrated aluminum roller to exclude all trapped air. Additional resin is added, followed by a second layer of 1.5 oz. chopped fiberglass mat. The laminate is rolled again to remove any entrapped air. After adding additional resin, the final surface is applied and smoothed out. Straight steel rails of ⅛ inch square in cross-section are placed along all four sides of the laminate. A cover sheet of Mylar is rolled onto a 2-inch diameter tube long enough to bridge the rails. Additional resin is added to the laminate and the Mylar is rolled out over it. The Mylar is then stretched tightly and taped down. Any entrapped air or excess resin is squeezed out of the laminate using a wooden tongue depressor. The laminate is left until the polymerization exotherm has subsided and cooling to ambient temperature has occurred. The laminate is removed and postcured at 93° C. (200° F.) for 2.0 hours.

Standard tensile and flexural test pieces are prepared from each of the laminates and the mechanical properties evaluated using the method of Example No. 4. The results are reported in Table VI.

TABLE VI

| | (Example 12) | |
|---|---|---|
| Properties | Example 10 | Comparative* Example 3 |
| Tensile Strength × $10^3$ (psi) | 9.9 | 8.6 |
| Elongation (%) | 1.9 | 1.6 |
| Flexural Strength × $10^3$ (psi) | 15.0 | 15.3 |
| Flexural Modulus × $10^5$ (psi) | 7.2 | 8.6 |
| Average Barcol Hardness | 48 | 48 |

*Not an example of the invention.

EXAMPLE 13

A portion of the dicyclopentadiene modified unsaturated polyesteramide of Example 9 and Comparative Example 2 are each formulated to provide 57.0 percent alkyd-43.0 percent styrene solutions. These solutions are used to prepare 0.0625 inch clear, unfilled castings and cured using the method of Example 4. A test piece is prepared from each casting so as to have the following measurements: 6.5 inches length, 0.625 inch width at tab ends, routed to a 0.400 inch width at center. Each test piece is used for plane strain compression testing with applied tension using the methods of P. B. Bowden and J. A. Jukes reported in the "Journal of Material Science," 3,183 (1968) and 7,52 (1972). The sample cross-sectional area is 0.025 square inch and tensile load is increased in 564 psi increments. The creep rate taken as yield is approximately 0.002 inch per minute. Tension (psi) versus compression (psi) yield point values thus obtained are plotted. Tensile and compressive yield strength values are determined by extrapolation of the plotted biaxial yield line. Ductility is calculated as the ratio of compression at break to the compressive yield strength; and that value is subtracted from one. The results are reported in Table VII.

TABLE VII

| | (Example 13) | |
|---|---|---|
| Properties | Example 9 | Comparative* Example 2 |
| Ductility | 0.43 | 0.06 |
| Tension at Break (psi) | 5,300 | 919 |
| Compression at Break (psi) | 10,773 | 18,515 |
| Tensile Yield Strength (psi) | 12,400 | (1) |
| Compressive Yield Strength (psi) | 18,728 | 19,697 |

*Not an example of the invention.
(1) Cannot be extrapolated accurately with data points collected.

What is claimed is:

1. An unsaturated polyesteramide comprising the reaction product of
   a. a curing amount of a diacid or anhydride of a diacid;
   b. a curing amount of a polyahl; and
   c. an effective amount of a poly[(alkionylimino)alkylene] such that a cured resin of said unsaturated polyesteramide has increased physical properties compared to a cured resin prepared without said poly[(alkionylimino)alkylene];
   wherein at least a portion of one of the diacid or anhydride or the polyahl, contains addition polymerizable unsaturation.

2. The polyesteramide of claim 1 wherein the poly[(alkionylimino)alkylene] is poly[(propionylimino)ethylene].

3. The polyesteramide of claim 1 wherein the poly[(alkionylimino)alkylene] has a molar mass of about 500 to about 5,000,000 amu.

4. The polyesteramide of claim 1 wherein the diacid or anhydride has addition polymerizable unsaturation.

5. The polyesteramide of claim 1 wherein at least a portion of the polyester molecules are terminated with a norbornyl radical.

6. The polyesteramide of claim 5 wherein the norbornyl radical is formed from dicyclopentadiene.

7. The polyesteramide of claim 4 wherein the unsaturated diacid or anhydride is selected from the group comprising maleic acid, maleic anhydride, and fumaric acid.

8. The polyesteramide of claim 7 wherein the unsaturated diacid or anhydride is maleic anhydride.

9. The polyesteramide of claim 1 wherein the diacid or anhydride is a mixture of addition polymerizable unsaturated monomers or nonaddition polymerizable monomers.

10. The polyesteramide of claim 1 wherein the polyahl is a polyol.

11. The polyesteramide of claim 10 wherein the polyol is an aliphatic glycol.

12. The polyesteramide of claim 1 wherein the polyahl is a mixture comprising a polyol and a polyamine.

13. The polyesteramide of claim 1 wherein the diacid or anhydride and the polyahl have substantially reacted with each other before they are reacted with the poly[(alkionylimino)alkylene].

14. A method of producing an unsaturated polyesteramide comprising reacting
   a. a curing amount of an unsaturated diacid or anhydride of an unsaturated diacid;
   b. a curing amount of a polyahl; and
   c. an effective amount of a poly[(alkionylimino)alkylene] such that a cured resin of said unsaturated polyesteramide has increased physical properties compared to a cured resin prepared without said poly[(alkionylimino)alkylene].

15. The method of claim 14 wherein the diacid or anhydride and the polyahl have substantially reacted with each other before they are reacted with the poly[(alionylimino)alkylene].

16. A blend comprising the polyesteramide of claim 1 and an addition polymerizable monomer.

17. The blend of claim 16 wherein the monomer is styrene.

18. A solid product comprising the blend of claim 16 which has been addition polymerized.

* * * * *

UNITED STATES PATENT AND TRADEMARK OFFICE
CERTIFICATE OF CORRECTION

PATENT NO. : 4,485,220

DATED : November 27, 1984

INVENTOR(S) : Robert E. Hefner, Jr. and Robert E. Hefner, Sr.

It is certified that error appears in the above—identified patent and that said Letters Patent is hereby corrected as shown below:

Col. 1, line 12, "alchols" should read --alcohols--.

Col. 4, line 20, "(e.g., about 100° to about 225°C." should read --(e.g., about 100° to about 225°C.)--.

Col. 5, line 14, "575-549" should read --549-575--; line 40, "specied" should read --specified--; and line 52, "The dicylopentadi-" should read --The dicyclopentadi---.

Col. 6, line 63, "anhdyride" should read --anhydride--.

Col. 13, line 9, TABLE VI subheading "Example 10" should read --Example 9--; line 23, "Example 2" should read --Example 3--; and line 48 of subheading on lines 47 and 48 of TABLE VII, "Comparative Example 2" should read --Comparative Example 3--.

Col. 14, line 56, Claim 15, last line, "(alionylimino)-alkylene]." should read --(alkionylimino)alkylene].--.

Signed and Sealed this

Tenth Day of September 1985

[SEAL]

Attest:

DONALD J. QUIGG

Attesting Officer    Acting Commissioner of Patents and Trademarks - Designate